US012762104B2

(12) United States Patent
Meister et al.

(10) Patent No.: US 12,762,104 B2
(45) Date of Patent: Oct. 13, 2026

(54) SIMULATED ANNEALING FOR PARALLEL INSERTION-BASED BVH OPTIMIZATION

(71) Applicant: Advanced Micro Devices, Inc., Santa Clara, CA (US)

(72) Inventors: Daniel Meister, Tokyo (JP); Jirí Bittner, Prague (CZ)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/068,442

(22) Filed: Dec. 19, 2022

(65) Prior Publication Data

US 2024/0202178 A1 Jun. 20, 2024

(51) Int. Cl.
*G06F 16/22* (2019.01)

(52) U.S. Cl.
CPC ................................ *G06F 16/2246* (2019.01)

(58) Field of Classification Search
None
See application file for complete search history.

(56) References Cited

U.S. PATENT DOCUMENTS

| | | | |
|---|---|---|---|
| 8,587,588 B2 | 11/2013 | Smyth | |
| 9,928,640 B2 | 3/2018 | Woop et al. | |
| 10,580,193 B2 | 3/2020 | Havran et al. | |
| 11,158,112 B1 | 10/2021 | Yeo et al. | |
| 11,436,504 B1 * | 9/2022 | Lukarski | G06N 5/04 |
| 11,727,246 B2 | 8/2023 | Ma | |
| 2014/0168238 A1 | 6/2014 | Luebke | |
| 2014/0333622 A1 | 11/2014 | Gies | |
| 2014/0365532 A1 * | 12/2014 | Karras | G06F 16/2246 707/803 |
| 2020/0051318 A1 | 2/2020 | Muthler | |
| 2020/0134904 A1 * | 4/2020 | Zhao | G06T 15/06 |
| 2020/0211260 A1 * | 7/2020 | Xiao | G06T 1/20 |
| 2020/0264970 A1 | 8/2020 | Lee | |
| 2021/0090207 A1 | 3/2021 | Doyle | |
| 2021/0248806 A1 | 8/2021 | Yang | |
| 2021/0304484 A1 | 9/2021 | Saleh et al. | |
| 2021/0327118 A1 | 10/2021 | Varadarajan | |
| 2021/0383591 A1 * | 12/2021 | Gupta | G06T 15/08 |
| 2022/0036637 A1 | 2/2022 | Rabbani Rankouhi | |
| 2022/0114013 A1 | 4/2022 | Goudie | |
| 2022/0301255 A1 * | 9/2022 | Clark | G06T 15/005 |
| 2023/0066636 A1 * | 3/2023 | Morrical | G06T 15/04 |

(Continued)

OTHER PUBLICATIONS

Parallel Reinsertion for Bounding vol. Hierarchy Optimization (Year: 2018).*

(Continued)

*Primary Examiner* — Augustine K. Obisesan
(74) *Attorney, Agent, or Firm* — Kowert, Hood, Munyon, Rankin & Goetzel, P.C.; Rory D. Rankin

(57) ABSTRACT

Systems, apparatuses, and methods for optimizing a bounding volume hierarchy (BVH) are disclosed. A system selects a first node having an initial position in the BVH structure. The system determines a new position for the first node in the BVH structure and restructures the BVH structure by removal of the first node from the initial position and insertion of the first node in the new position to replace a second node. The restructured BVH is optimized using perturbation to achieve global surface area reduction.

20 Claims, 7 Drawing Sheets

(56) References Cited

U.S. PATENT DOCUMENTS

| | | | | |
|---|---|---|---|---|
| 2023/0102071 | A1 | 3/2023 | Burns | |
| 2023/0297508 | A1 | 9/2023 | Zirr | |
| 2023/0298127 | A1 | 9/2023 | Barczak | |
| 2023/0334770 | A1 | 10/2023 | Davison | |
| 2023/0334777 | A1* | 10/2023 | Davison | G06T 17/005 |
| 2023/0359496 | A1 | 11/2023 | Majewski | |
| 2023/0377267 | A1* | 11/2023 | Tessari | G06T 15/06 |
| 2024/0177401 | A1 | 5/2024 | Fuller | |

OTHER PUBLICATIONS

Automatic Creation of Object Hierarchies for Ray Tracing, Goldsmith et al.(Year: 1987).*

Incremental BVH construction for ray tracing, Bittner et al. Computers & Graphics47(2015)135-144 (Year: 2015).*

Meister et al., "A Survey on Bounding Volume Hierarchies for Ray Tracing", Computer Graphics Forum, EUROGRAPHICS 2021, vol. 40 (2021), No. 2, 30 pages, https://meistdan.github.io/publications/bvh_star/paper.pdf. [Retrieved Jun. 23, 2022].

Office Action for U.S. Appl. No. 18/519,521, dated Jul. 10, 2025, 18 pp.

Office Action for U.S. Appl. No. 18/519,521, dated Dec. 5, 2025, 21 pp.

Office Action for U.S. Appl. No. 18/753,602 dated Mar. 19, 2026, 29 pp.

Office Action in U.S. Appl. No. 18/519,521, dated May 15, 2026, 24 pp.

* cited by examiner

SIMULATED ANNEALING FOR PARALLEL INSERTION-BASED BVH OPTIMIZATION

BACKGROUND

Description of the Related Art

In the process of testing for object intersection using simulated light rays, known as ray tracing, pixels are identified according to the outcome of the ray cast. Compared to rasterization-based methods, ray tracing is computationally more expensive but outputs are more physically accurate. Improvements to methods used for ray tracing operations have continuously been of interest. One such method is the use of bounding volumes to perform ray tracing.

Generally, in order to speed up the ray tracing process, scene primitives are frequently organized in spatial data structures. To this end, bounding volume hierarchies (BVH) have been used in real-time applications. BVH has emerged as the standard for ray tracing-based rendering algorithms over the past few decades. A BVH comprises a hierarchical tree structure corresponding to a collection of geometric objects. All geometrical elements that make up the tree's leaf nodes are contained within bounding volumes. These may be then grouped and encompassed within larger bounding volumes. This ultimately results in creating a tree structure with a single bounding volume that encompasses all objects in a scene. Although many BVH optimization techniques are in use, computation costs can be high.

In view of the above, improved systems and methods to achieve desirable ray tracing performance for GPU-based BVH construction methods are needed.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for optimizing bounding volume hierarchies (BVH) are disclosed. In various implementations, a system comprises a processing unit and a memory storing a hierarchical tree structure having a plurality of leaf-nodes and a plurality of non-leaf nodes, such as internal nodes and a root node. In one implementation, the BVH is a tree structure representing a set of geometric objects in a scene (e.g., an image to be rendered for display). The hierarchical tree is a rooted tree comprising references to one or more scene primitives (i.e., geometric objects) that are represented by leaf nodes. Further, the scene primitives are enclosed within bounding volumes that are represented by one or more internal nodes of the tree.

The processing unit selects an internal node of the BVH with an initial position as an input node. In an implementation, the processing unit randomizes the selection of the input node, such that any internal node from the one or more internal nodes, except a root node, is selected to be the input node. Further, in various implementations, two or more input nodes (e.g., two or more input nodes of the tree) are selected and processed in parallel.

The processing unit then determines a new position for the input node in the hierarchical tree structure based in part on a simulated annealing operation. The processing unit restructures the hierarchical tree structure by removal of the input node from the initial position and insertion of the input node in a new position, e.g., merging an output node with the input node using the parent node of the input node as a common parent node.

Figure 1:
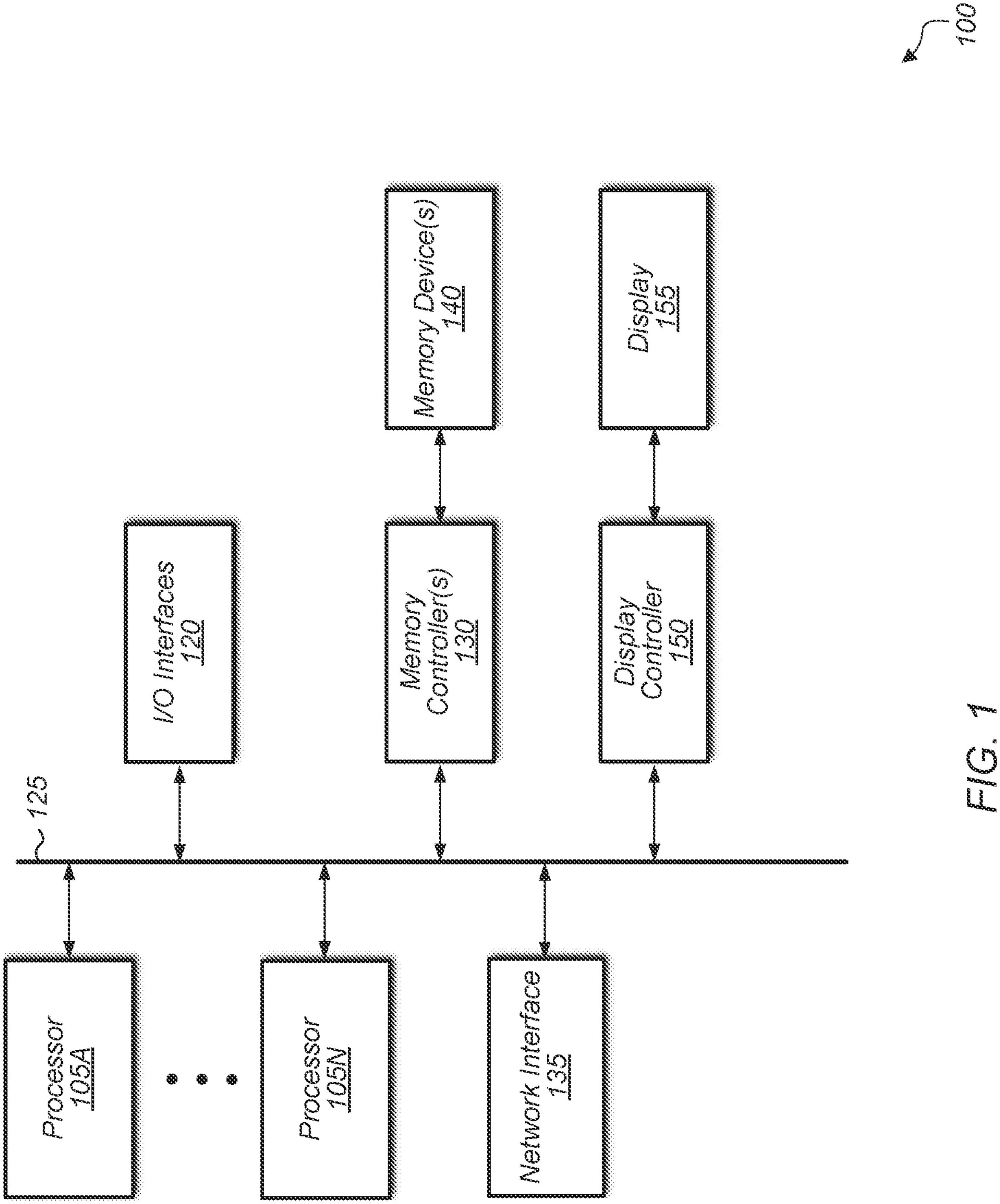
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100. In several implementations, one or more of processors 105A-N are configured to execute a plurality of instructions to perform functions as described with respect to FIGS. 5-7 herein.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
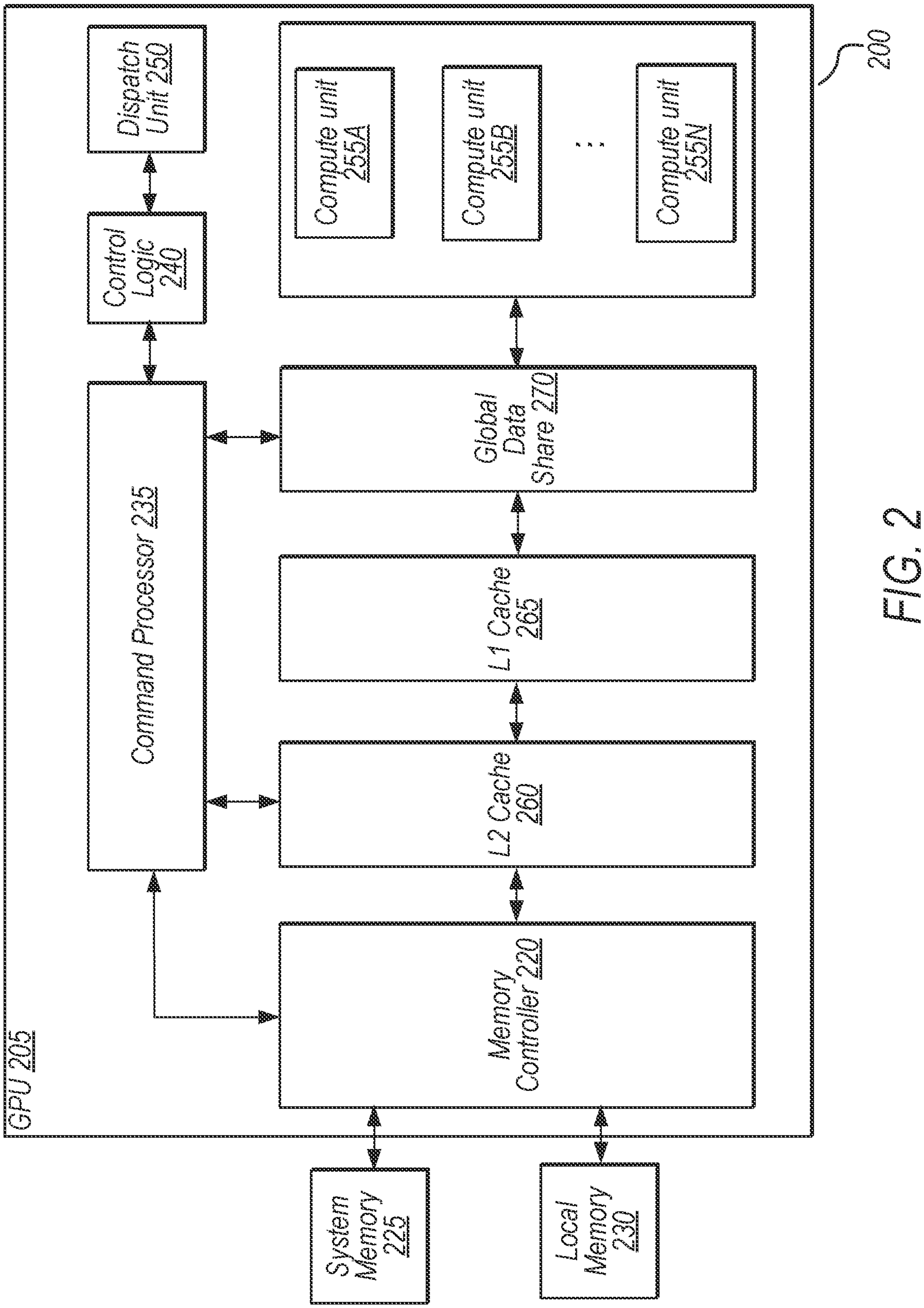
FIG. 2 illustrates the details of the computing device.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to issue corresponding wavefronts to compute units 255A-N. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

In one implementation, compute units 255A-N implement ray tracing, to render a 3D scene by using a hierarchical tree structure (referred to as a bounding volume hierarchy). For example, the compute units 255A-N are configured to perform ray tracing operations, including testing for intersection between light rays and objects in a scene geometry. In some implementations, at least some of the work involved in ray tracing is performed by programmable shader programs that are executed on the compute units 255A-N, as described in additional detail below.

A ray intersection test directs a ray from an originating source, determines if the ray intersects a geometric primitive (e.g., triangles, implicit surfaces, or complex geometric objects), and if so determines the distance from the origin to the intersection of the triangle. In an implementation, ray tracing tests use a spatial representation of nodes, such as Bounding Volume Hierarchy (BVH). In the BVH, each non-leaf node represents an axis-aligned bounding box that bounds the geometry of all children of that node. In one example, a root node represents the maximum extent over the area over which the ray intersection test is being performed. In this example, the root node has two child nodes, each representing a bounding box that typically divides the overall area. Each of these two child nodes has two child nodes also representing bounding boxes. Leaf nodes represent triangles or other geometric primitives on which ray intersection tests are performed (described in FIG. 3).

Further, in an implementation, based on the tracing of rays within a scene geometry, BVH structures are formed by command processor 235 and are stored in system memory 225 and/or local memory 230. A tree is loaded onto a memory, and the command processor 235 further executes optimizations on the hierarchical tree using methods described herein. Once a given BVH is optimized, ray intersection tests are performed again and the compute units 255A-N use the optimized BVH to retest ray intersections in a given scene geometry. These tests are used by shader programs running on the compute units 255A-N to generate images using ray tracing accelerated by the optimized BVH. The updated images are then queued for display by command processor 235. In an implementation, one or more of compute units 255A-N are configured to optimize the BVH as described with respect to FIGS. 5-7.

Figure 3:
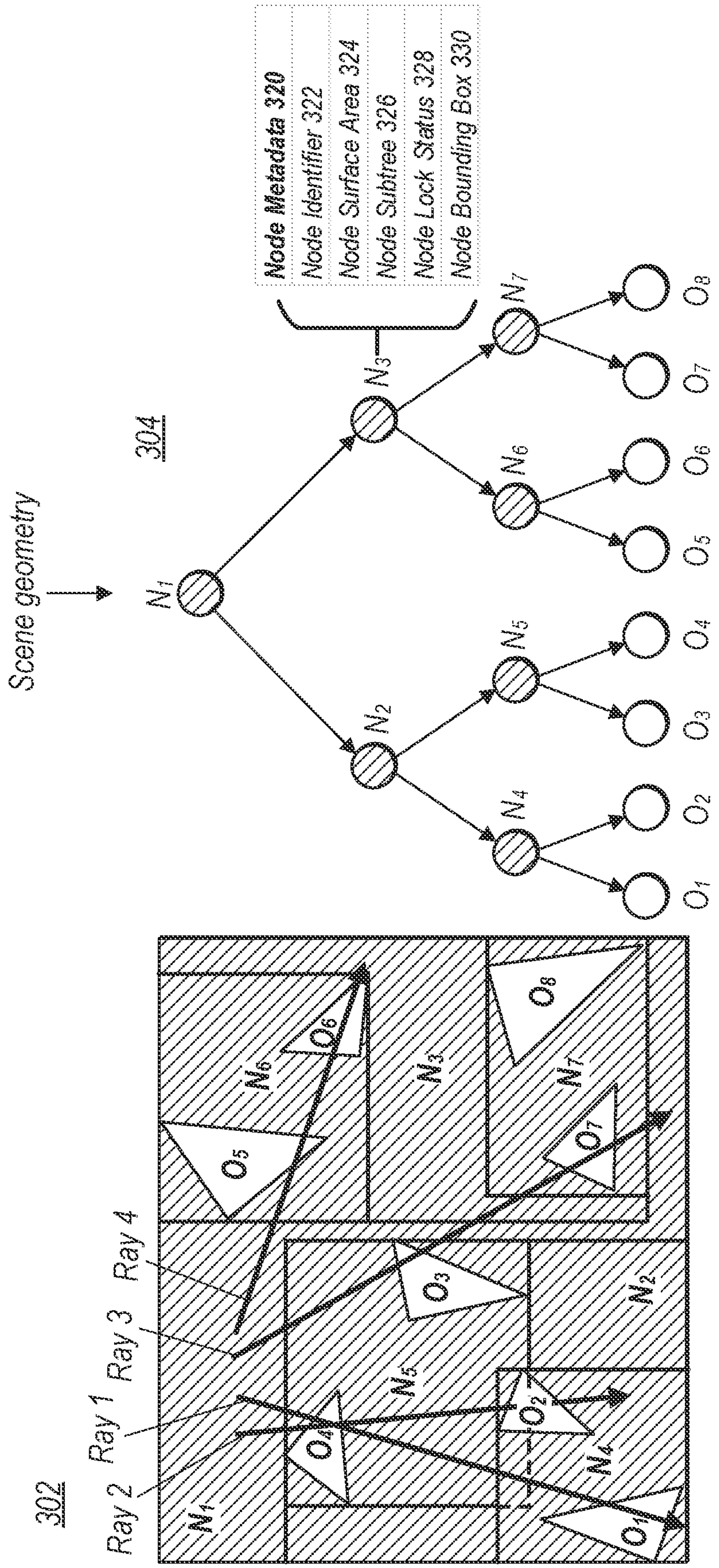
FIG. 3 is an illustration of a bounding volume hierarchy (BVH).

FIG. 3 is an illustration of a bounding volume hierarchy (BVH), according to an implementation. For simplicity, in the exemplary implementation depicted in FIG. 3, the hierarchy is shown in two-dimension. However, in various alternate implementations, extension to three-dimension may be possible, and it should be understood that the methods described herein would generally be applicable to three-dimensional hierarchies as well.

The spatial representation 302 of the BVH is illustrated in the left side of FIG. 3 and the tree representation 304 of the BVH is illustrated in the right side of FIG. 3. In one example, the bounding volumes are represented by "N," such that N1-N7, are distinct bounding boxes. In the example, bounding box N1 encompasses all other bounding boxes N2-N7. Further, each bounding box N2-N7 comprises one or more triangles, that represent geometric objects, and are denoted by "O." For example, bounding box N1 comprises all other bounding boxes and their respective triangles O1-O8. In a similar manner, bounding box N2 comprises of smaller bounding boxes N5 and N4, such that N4 comprises of triangles O1 and O2, and N5 comprises triangles O4 and O3. Further, for the sake of brevity, in the tree representation 304 the bounding boxes are each represented by a non-leaf node "N" and each triangle is represented by leaf nodes O.

In order to perform ray tracing for a scene, a processing unit (e.g., compute unit 255) performs a ray intersection test by traversing nodes of the tree 304, and, for each bounding box tested (i.e., by traversing respective internal nodes N), eliminating branches below a traversed node if the test for that node fails. In one example, it is assumed that ray 4 intersects triangle O5 as the closest hit. The processing unit would test against bounding box N1 by traversing to respective node N1, determining that the test succeeds (Ray 4 intersects node N1. The processing unit then traverses the tree to node N2 and tests against bounding box N2, determining that the test fails (since ray 4 does not intersect node N2). Consequently, sub nodes of N2 need not be tested. The processing unit then tests against bounding box N3. Noting that that test succeeds (ray 4 intersects with node N3). Tests are then performed against bounding boxes N6 and N7, by traversing through their respective representative nodes N6 and N7, noting that the test for node N6 succeeds but for node N7 fails. The processing unit would then test triangles O5 and O6 by traversing through representative leaf nodes O5 and O6, noting that test determines that O5 is the closest hit for the ray, and therefore the test for O5 succeeds, but O6 fails (even though the ray might hit O6, however it is not the closest hit). Therefore, instead of testing all eight triangles O1-O8, only two triangles (i.e., triangles O5 and O6) and five bounding boxes tests (N1, N2, N3, N6, and N7) are tested.

In an implementation, the BVH 304 is generated using a given scene geometry. The scene geometry includes primitives that describe a scene comprising one or more geometric objects, which is provided by an application or other entity. In one implementation, software executing on a processor, such as the command processor 235, is configured to perform the functionality described herein, hard-wired circuitry configured to perform the functionality described herein, or a combination of software executing on a processor and hard-wired circuitry that together are configured to perform the functionality described herein. In various examples, the BVH 304 is constructed using one or more shader programs, such as executing on the compute units 255A-N, or on a hardware unit in the command processor 235. In various embodiments, the BVH 304 is constructed prior to runtime. In other examples, the BVH 304 is constructed at runtime, on the same computer that renders the scene using ray tracing techniques. In various examples, a driver, an application, or a hardware unit of the command processor 235 performs this runtime rendering.

In an exemplary implementation, a data structure comprising one or more data fields, each containing information pertaining to the different nodes of the BVH 304, is stored in a memory location accessible by a processing unit, such as the command processor 235 or one or more compute units 255. For example, the data structure is stored system memory 225 or local memory 230, such that each time a hierarchical tree is created and/or updated, the data structure is updated by the processing unit. An exemplary data structure is shown in FIG. 3, represented by node metadata 320 (i.e., data corresponding to the node) and comprising one or more data fields such as, but not limiting to, node identifier 322, node surface area 324, node subtree information 326, node lock status 328, and node bounding box 330.

In an implementation, node identifier 322 comprises numerical identifiers identifying each node of the BVH 304, e.g., whether a given node is an internal node, a root node, or a leaf node. For example, node N1 is a root node, nodes N2-N7 are internal nodes and nodes O1-O8 are leaf nodes. Further, each node's current surface area 324 is also available to the processing unit from the node metadata 320, so that the processing unit executes one or more instructions, as described with respect to FIGS. 5-7, to identify one or more new positions to move the input node from its original position, in the BVH 304. In various exemplary implementations, a computing unit (such as command processor 235) is configured to determine surface area of each node, by computing surface areas of associated bounding boxes. Referring to the example of FIG. 3, a computing unit calculates respective surface areas of nodes N1-N7 of BVH 304, by computing surface areas of their respective bounding boxes, as shown in representation 302. The cumulative surface area of the BVH 304 is then given as the sum of individual node surface areas 324.

The node metadata 320 further comprises data pertaining to node subtrees 326. For instance, for each internal node N1-N7, the node subtree 326 field would describe relationships of a given internal node with their respective child nodes, e.g., left child node and right child node for a given internal node. The node subtree 326 field further describes which leaf node is a left child node of an internal node and which leaf node is a right child node of the internal node. This information can be utilized by the processing unit to traverse the BVH 304 while determining alternative positions to reposition a given internal node (i.e., an input node), along with its entire subtree. When such alternative positions are determined by the processing unit, there may be scenarios wherein conflicts occur, since a plurality of input nodes are processed simultaneously by the processing unit. In order to resolve such conflicts, the processing unit is configured to lock one or more nodes, as described with respect to FIGS. 6 and 7, such that once a node is locked, no further changes to node metadata 320 can be performed for the locked node. The lock status for any given node is given by node lock status 328 field in the node metadata 320.

In an implementation, the node metadata 320 also stores information pertaining to node bounding box 330 for each node N. For instance, for node N5, the node bounding box 330 information can include identification of objects O4 and O5 comprised in the bounding box, the minimum point coordinates of the bounding box, the maximum point coordinates of the bounding box, and the like. In one implementation, the computing unit can utilize the bounding box 330 information in order to determine the individual surface area for each node N, and updated as node surface area 324. Further, a cumulative surface area of the BVH 304 is given by the sum of individual surface area of each node.

In an implementation, systems and methods described herein facilitate for optimization of the BVH 304, at least based in part on a rearrangement of the BVH 304 to reduce the cumulative surface area of the BVH 304. To this end, one or more nodes are processed as input nodes such that a new position for repositioning a given input node is chosen, such that the repositioning results in reduction of overall surface area cost of the BVH 304. In order to perform the repositioning, the processing unit finds the new position for the input node by identifying an output node (other than the root node), such that replacing the output node with the input node in the BVH 304 results in the reducing the value of the accumulated surface area the most.

In an implementation, the processing unit updates the node metadata 320, for each node, when a given node is repositioned from its original position to a new position. For example, if the input node is node N3 and node N3 is repositioned from its current position to a new position, the processing unit updates the metadata 320 to indicate changes in spatial relationships of the node N3 with all other nodes in the BVH 304. Further, the accumulated surface area reduction if such a repositioning occurs, is computed by the processing unit, by calculating respective reductions in surface area of all nodes traversed on a path located between the input node and the output node, excluding the input node, the output node, and the parent node of the input node. Bounding boxes represented by each node are constructed at the time of generation of BVH 304, and subsequently surface area of each node is computed and updated in respective node metadata 320. It is noteworthy, that only nodes representing bounding boxes, i.e., internal nodes, would have an associated surface area value that may change over time, due to repositioning of the nodes from their initial positions to new positions. The surface areas of leaf-nodes do not change even when the position of the leaf node changes in the BVH 304. However, the surface areas of non-leaf nodes are used by the processing unit to compute cumulative surface area deductions owing to repositioning of one or more nodes in the BVH 304.

Figure 4:
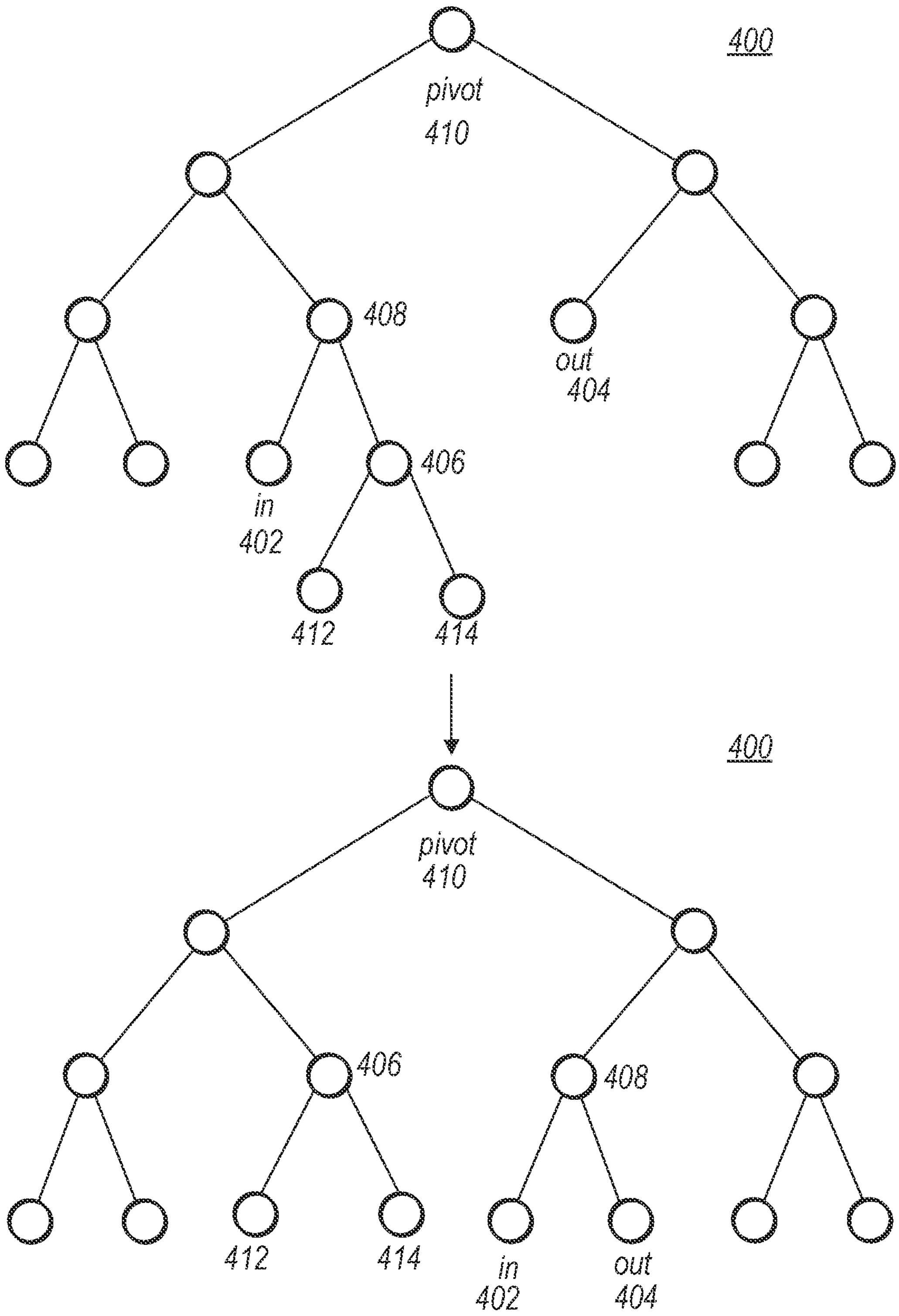
FIG. 4 illustrates an exemplary modification of a BVH topology for optimizing the BVH.

Turning now to FIG. 4, an exemplary implementation for optimizing a bounding volume hierarchy (BVH) 400 is illustrated. The BVH 400 is herein interchangeably referred to as tree 400 or hierarchical tree 400. In an implementation, optimizing of the BVH 400 comprises repositioning one or more interior nodes (hereinafter "input nodes") in the tree 400 from their respective initial positions to potential new positions, after the creation of the BVH 400, such that the repositioning would result in a reduction in surface area of the BVH 400. As described in the foregoing, the BVH 400 is created as containing one or more triangles within bounding boxes, such that each non-leaf node in the BVH 400 represents a bounding box and each leaf node in the BVH 400 represents a triangle.

In operation, the optimization of the tree 400 by a processing unit (e.g., compute unit 255) comprises of two parts, namely, removal of a selected input node from an initial position (e.g., original position) in the tree 400 and insertion of the input node at a new position (i.e., at a position of an output node) in the tree 400. According to an implementation, the processing unit selects a given node as the input node and identifies the output node, using an iterative selection process as described later, such that repositioning the input node to the position of the identified output node results in a surface area reduction of nodes located on a path between the input node and the output node, that in turn affects the SAH cost of the entire tree 400.

In one implementation, the processing unit selects multiple input nodes for parallel processing, based at least in part on node identifications retrieved from the node metadata 320, as described in FIG. 3. In an example, each input node is selected for a proposed repositioning, and a respective output node is determined by traversing the tree 400 in a predetermined traversal sequence the determination based at least in part on the changes in the surface area of the tree, that would result owing to the proposed repositioning.

As described in the foregoing, the optimization of the tree 400 comprises of two phases, i.e., removal of a node from an original position and insertion of the node in a new position. According to the example BVH 400 depicted in FIG. 4, for the removal phase, a current input node 402, along with its entire subtree (not shown) and its parent node 408 are removed from their original positions, and a sibling node 406 of the input node 402 is connected to the original position of the input node's parent node 408. In the insertion phase, the input node 402 is inserted into the position of the output node 404 using a parent node 408 of the input node 402 as a common parent node for the input node 402 and output node 404. As described with respect to FIG. 3, each node is one of an internal node, or a leaf node. The removal and insertion of nodes is performed at least to optimize the tree 400, such that the tree 400, when updated with the new positions of one or more input nodes, has the lowest possible cumulative surface area.

For the sake of brevity, the methods and systems described herein consider the surface area of the tree 400 to be directly proportional to the sum of the surface area of the bounding boxes represented by nodes forming the tree 400. That is, the total decrease in the surface area of the tree 400 is equal to the sum of decreases of surface areas of one or more affected bounding boxes of the nodes of the tree 400. Further, in one implementation, only surface areas of bounding boxes represented by nodes located on a path between the input node 402 and the output node 404, excluding the input node's parent node 408, are affected by repositioning of the input node 402 from its original position to the position of the output node.

In one implementation, in order to reposition the input node 402 from its original position in the tree 400 to a new position, the processing unit first identifies a potential output node 404 by traversing the tree 400. In one implementation, the identification of the output node 404 is an iterative process, such that the processing unit traverses the tree 400 to identify one or more nodes as "current" output nodes, till a "final" output node 404 is identified. According to the implementation, during the traversal of the tree 400, the processing unit compares a potential reduction in surface area of the tree 400 that would result from repositioning the input node to a given output node position, with the reduction in surface area that would result from repositioning the input node to a previously found output node position. Based on such comparisons during the traversal, the processing unit keeps updating the output nodes, such that the final output node 404 is selected, wherein repositioning of the input node 402 to the output node 404 results in the decrease in the surface area of the tree 400 to the greatest possible extent.

Once the output node 404 is identified by the processing unit for the input node 402, the input node 402 is removed from its original positions and then reinserted into the position indicated by the output node 404. Since multiple input nodes are processed in parallel, in some cases, repositioning of multiple input nodes can result in one or more conflicts. For instance, when two or more execution cycles are trying to modify a topology of a same output node in the tree, a topological conflict can occur. In order to resolve these conflicts, the nodes involving the topological change are locked by the processing unit, in order to prevent racing conditions. Only when all nodes are successfully locked, the repositioning is performed. Alternatively, one or more of such repositioning operations may be abandoned, e.g., a repositioning operation that would result in a lower surface area reduction.

In operation, the processing traverses the hierarchical tree 400 until it reaches a root node (or a pivot node). In one example, the traversed path breaks at the node 410, denoted as pivot node 410. In an implementation, during proposed repositioning of nodes, surface areas of the tree 400 decrease since nodes are removed from their original positions. According to the implementation, removal of subtrees of nodes from their original positions results in shrinkage of respective bounding boxes, thereby resulting in a surface area decrease for the tree 400. Additionally, corresponding to the insertion of the nodes at new positions, the surface area of the tree 400 increases. The surface area for the pivot node 410 remains unchanged. In an implementation, the processing system determines a potential new position for a given node, based at least in part on a determination that the decrease in the surface area of the tree 400 owing to removal of node from its initial position, is greater than the increase in the surface area of the tree 400 owing to the insertion of the node at the new position.

For instance, in the example depicted in FIG. 4, the processing unit traverses the hierarchical tree 400 starting at the selected input node 402 to all nodes except nodes below the level of the input node 402. The traversal begins on a path starting with the input node 402 and processing all sibling subtrees on the path, till a root node is reached. A subtree, in an example, is a set of nodes, including a subtree root node, and internal nodes and leaf nodes below the subtree root node. For instance, in the example depicted in FIG. 4, a subtree comprises of nodes 408, 402, and 406, along with leaf nodes 412 and 414, with node 408 as the subtree root node.

The decrease in surface area resulting from proposed movement of the input node 402 to the position of the output node 404 is then accumulated as a change in surface areas for the input node 402 as well as the output node 404. When the difference between the reduction in the surface area that would occur due to a proposed removal of the input node exceeds the increase in the surface area due to the proposed insertion of the input node 402 and its subtree to replace the output node 404, and said difference further exceeds a predetermined threshold, the output node 404 is selected as a potential output node candidate. The processing unit continues the traversal to identify multiple such output node candidates, and the output node candidate for which the reduction in the surface area exceeds the increase in the surface area the greatest, is selected as the final output node (after considering any potential conflicts).

In an exemplary implementation, while traversing the tree 400, pruning is applied to the traversal in order to mitigate inefficiencies in traversal. Pruning ensures that one or more nodes that do not affect a cumulative change in the surface area of the tree 400 are not traversed. In one example, application of space pruning allows the processing unit to efficiently filter out one or more nodes that are inconsequential to the surface area reduction.

As described above, new positions for one or more input nodes are identified, such that moving the one or more input nodes to new positions achieves an overall reduction of an accumulated surface area cost of the tree, thereby aiding in global cost reduction. Although, optimizing the tree 400, using the above techniques systematically minimizes the surface area globally, this may also result in convergence to a local minimum, thereby providing sub-optimal results. In order to ensure that such a local minimum is avoided, the processing unit can use one or more perturbations to the selection of potential output nodes, in order to avoid the system getting stuck in local minima. In an implementation, in one such perturbation from determination of new positions for a given input node, the processing system prioritizes selection of a node as a potential output node, when the proposed repositioning of the given input node to the potential output node would increase the surface area cost of the tree 400. That is, the system also includes nodes as output nodes that that temporarily increase the global cost based on a stochastic decision to prevent getting stuck in local minima. This is further detailed with reference to FIG. 7. Other possible perturbations are contemplated.

Figure 5:
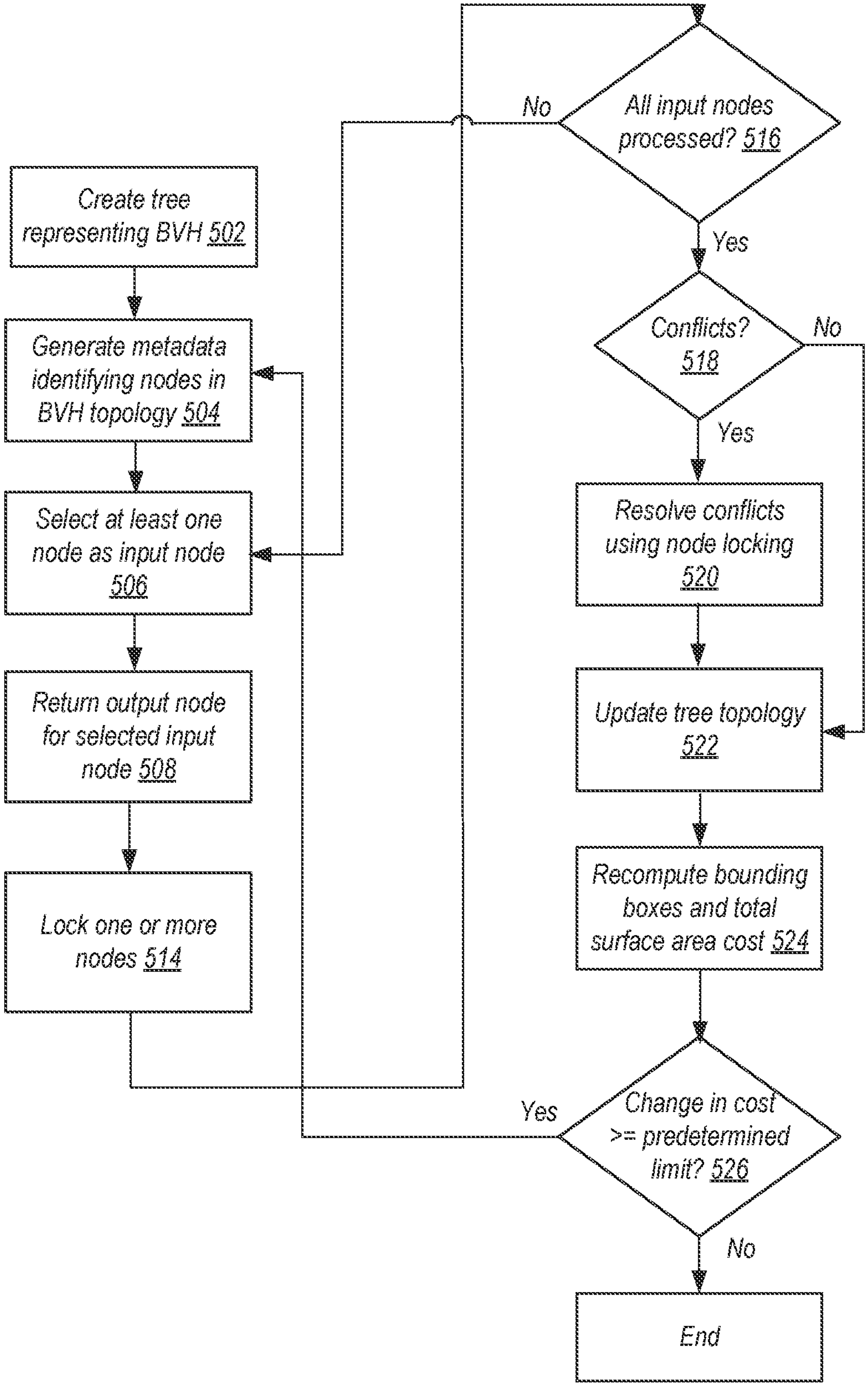
FIG. 5 illustrates an exemplary method for optimization of BVH by modifying the BVH topology.

Turning now to FIG. 5, an exemplary method for optimization of BVH by modifying the BVH topology is illustrated. In an implementation, a processing unit (such as compute unit 255A-N) selects at least one input node of a hierarchical tree to be processed and determines one or more potential output nodes to reposition the input node along with its subtree, such that the proposed repositioning reduces the overall surface area of the tree. That is, for each potential output node, the processing unit determines a surface area decrease that would result from the proposed repositioning of the input node to each of the potential output nodes and select a final output node based on the highest reduction in the surface area of the tree. In another implementation, the processing unit generates a perturbation in determination of the output nodes, by prioritizing selection of one or more nodes as output node, such that a proposed repositioning of the input node to such an output node increases the surface area of the tree. The perturbation is performed in order to include potential new positions for the input node, that would otherwise be disregarded, since these positions do not result in improvement in the overall surface area of the tree.

In an implementation, as described in FIG. 3, a tree representing a bounding volume hierarchy (BVH) is generated (block 502). In an example, the BVH (or tree) is generated prior to ray tracing, such that nodes of the tree each represent a bounding box. Based on the initial positioning of nodes in the tree, the processing unit generates metadata (e.g., metadata 320), wherein the metadata identifies information pertaining to each node of the tree (block 504). The processing unit selects at least one node as an input node (e.g., an internal or non-leaf node of the tree) to determine potential new positions to reposition the input node (block 506). For the ease of understanding, the method of FIG. 5 is described with respect to a single input node, however, it is understood that a plurality of input nodes can be processed simultaneously.

For the selected input node, the processing unit returns the last determined potential new position (block 508), i.e., an output node. In an implementation, an output node is identified at least in part based on a change in the surface area of the tree, that would result responsive to a proposed repositioning of the input node to the position of the output node. In an implementation, the processing unit traverses the tree in a predetermined traversal order and identifies a first output node for the input node, wherein nodes that would result in no surface area changes and/or surface area changes less than a predetermined limit, are eliminated from consideration as potential output nodes. Further, the processing unit selects the first output node for the proposed repositioning of the input node, if the proposed repositioning would result in the reduction of the surface area of the tree, the reduction being greater than or equal to the predetermined limit. The identification and selection of a final output node, from one or more potential output nodes, is described in further detail with respect to FIGS. 6 and 7.

The processing unit, responsive to selecting the final output node, can lock one or more relevant nodes (block 514). For instance, the processing unit applies atomic locks to affected nodes, e.g., the input node, the output node, the input node's parent and grandparent node, and the output node's parent node. Such atomic locks prevent racing conditions and ensure that a single output node is available only for repositioning a single input node. Further, the locking of the nodes between the input node and the output node can be performed to ensure that the computed surface area decreases are not affected by other nodes processed in parallel.

In one implementation, there may be two different locking strategies used by the processing unit to lock nodes, viz., a conservative strategy and an aggressive strategy. According to the implementation, in a conservative strategy, the processing unit locks the input node, the input node's parent node, its grandparent node, any sibling nodes, an identified output node, and the output node's parent node. In the aggressive strategy, the processing unit only locks nodes that are being modified, e.g., the input node and the output node. In one implementation, the aggressive can be more efficient as it allows to perform more insertions in parallel with fewer nodes locked.

In an implementation, once the nodes are locked, the processing unit updates the node lock status 328 of the node metadata 320. After successfully locking all affected nodes, the processing unit determines whether all input nodes have been processed (conditional block 516). If one or more input nodes have not been processed, (conditional block 516, “no” leg), the method continues to block 506, wherein at least one input node is selected for processing. However, if all input nodes have been processed (conditional block 516, “yes” leg), the processing unit further determines if there are any conflicts in selection of output nodes (conditional block 518). As described in the foregoing, one or more conflicts can occur during identification of output nodes, due to the parallel processing of multiple input nodes. For instance, when two or more execution cycles are trying to modify a topology of a same output node in the tree, a topological conflict may occur. If one or more such conflicts have occurred (conditional block 518, “yes” block), the processing unit resolves the conflicts using the atomic locks (block 520).

If there are no conflicts (conditional block 518, “no” leg), the method continues to block 522, wherein the processing unit the topology of the tree. For instance, the processing unit determines the changes in the topology of the tree, that would result due to the repositioning of the input node to the position of the final output node, and generate new topology for the tree. The processing unit is then configured to recompute the bounding boxes for each node and surface area change for the tree (block 524). The changes in the bounding boxes occur as a result of the proposed repositioning of the input node to replace the final output node. Further, based on the recomputed bounding boxes, the processing unit further recalculates the surface area of the tree, e.g., as given by a sum of individual surface area of the nodes.

In an implementation, based at least in part of the change in the surface area of the tree, the processing unit further determines whether a change in the surface area cost of the tree is greater than or equal to a predetermined limit (conditional block 526). In an example, the predetermined limit may be set of a constant numerical value, such as Epsilon. If it is determined that the change in cost is not greater than equal to the predetermined limit (conditional block 526, “no” leg), the method ends. Otherwise, if the change in the cost is greater than or equal to the predetermined limit (conditional block 526, “yes” leg), the method continues to block 504, wherein the node metadata 320 is updated based on the updated topology.

In an implementation, the processing unit continues to iteratively update the topology of the tree and attempts optimization of each updated tree in order to realize reduction in surface area cost of the tree. Once it is determined that no changes to topology result in any changes in the surface area of the cost (or the surface area cost in an iteration increases from a previous iteration), the tree is no longer updated. In such an iterative process, new positions for one or more input nodes are continuously identified and updated, such that moving the one or more input nodes to new positions achieves an overall reduction of an accumulated surface area cost of the tree, thereby aiding in global cost reduction.

Figure 6:
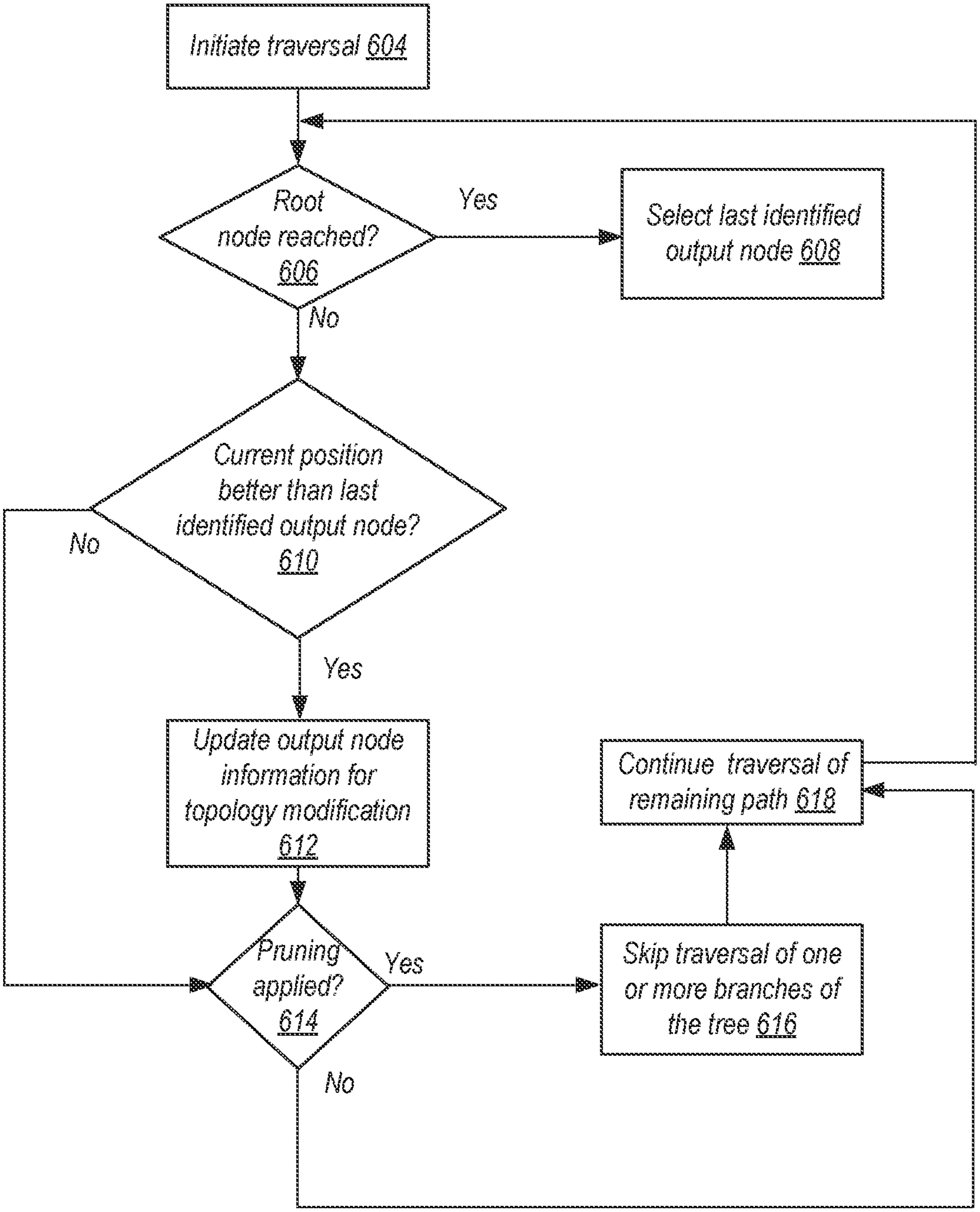
FIG. 6 illustrates an exemplary method for parallel insertion-based optimization of BVH.

Turning now to FIG. 6, an exemplary method for parallel insertion-based optimization of BVH is illustrated. As described herein, the method of FIG. 6 is performed for each input node selection (as described for block 506 in FIG. 5). Once the input node is selected, the processing unit initiates traversal of the tree (block 604). In an implementation, the tree is traversed in a predetermined traversal order, to identify one or more output nodes that can serve as potential new positions for proposed repositioning of the input node in order to realize a reduction in the surface area of the tree.

The processing unit then determines whether a root node is reached in during the traversal (conditional block 606). In case the root node is reached (conditional block 606, “yes” leg), the processing unit selects the last identified output node as the final output node (block 608). As described earlier, for a given input node, the processing unit continuously identifies potential output nodes by traversing the tree till a final output node is identified such that repositioning the input node to replace the final output node results in the greatest surface area reduction of the tree, as compared to other potential output nodes. In an implementation, the traversal of the tree is performed till a root node is reached.

In case, however, if the root node is not yet reached (conditional block 606, “no” leg), the processing unit determines whether a current position (i.e., a current potential output node), is better than the last identified output node (conditional block 610). That is, the processing unit determines whether a proposed repositioning of the input node to replace the current output node would provide a better optimization to the tree (in terms of surface area cost) than that provided by the last identified output node. If the current position is not better (conditional block 610, “no” leg), the method continues to block 614. Otherwise, if the current position is better (conditional block 610, “yes” leg), the processing unit updates the output node information for topology modification (block 612), i.e., the current position being now indicated as the output node.

Referring now to conditional block 614, the processing unit determines whether pruning has been applied to the traversal. In one implementation, pruning ensures that one or more nodes that do not affect a cumulative change in the surface area of the tree are not traversed. In one example, application of space pruning allows the processing unit to efficiently filter out one or more nodes that are inconsequential to the surface area reduction. If such a pruning has been applied (conditional block 614, “yes” leg), the processing unit skips traversal of one or more branches of the tree (block 616). In an implementation, the one or more branches are not traversed responsive to a determination that node(s) forming said branches do not affect any changes in the surface area reduction of the tree, when considered as potential output nodes. Other implementations are contemplated. The method then simply continues traversal to the rest of the nodes (block 618). If no pruning is applied (conditional block 614, “no” leg), the processing unit traverses all relevant branches of the tree for identification of potential output nodes. Once a final output node is selected, the processing unit can optimize the tree as described in FIG. 5.

As described in the foregoing with reference to parallel insertion-based methods for optimization of BVH, using these methods, the processing unit is configured to always accept output nodes that reduce the global surface area of the tree, thereby ensuring a reduction in the global cost. However, these methods may get stuck in a local minimum, i.e., selection of nodes simply focusing on the global area reduction, thereby resulting in sub-optimal BVH having lower quality. Therefore, in several implementations described in subsequent text, perturbations are introduced to methods proposed herein, such that the processing unit optimizes the tree by selecting output nodes that temporarily increase the global surface area, based on a stochastic choice to prevent getting stuck in local minima.

In one such exemplary perturbation, a simulated annealing procedure can be applied to augment the parallel insertion-based restructuring of the tree. Simulated annealing includes analysis of one or more derivable factors, such as, a randomized parameter (e.g., annealing temperature) and an acceptance probability function to select new output nodes, not otherwise selected, such that the decrease in the global surface area escapes the local minima. According to the implementation, the acceptance probability function is derived using the following exemplary sequence:

$$P(\Delta d, T) = \begin{cases} \min\left(e^{-\frac{\Delta d}{T}}, 1\right), & T > 0 \\ 0, & T = 0 \end{cases}, \quad (1)$$

wherein Δd is the difference of surface area of a proposed change in position of a node, and T is the current annealing temperature. In an implementation, the annealing temperature is a clamped sine function, given by the following exemplary sequence:

$$T(i) = \max\left(0, -\sin\left(\frac{2\pi i}{f}\right)\right) T_{max} \frac{I - i}{I}, \quad (2)$$

wherein f denotes the frequency of the sine function, $T_{max}$ is the maximum value of temperature allowed, i is the current iteration and/is the total number of iterations. This and other implementation of introducing perturbations are described with respect to FIG. 7.

In one implementation, when the value of T is greater than zero, a conservative strategy may be used to lock all nodes between the input and the output nodes (i.e., nodes locking as described in FIG. 5 is affected based on the value of T). Further, the value of T periodically increases and decreases (negative values are clamped to 0), such that temperatures higher than a given value infuse more randomness while temperatures lower than the given value result in the system choosing the method of FIG. 6 to identify the output nodes (i.e., the perturbation is not used). In an implementation, the value of T gradually decreases to zero as the sine amplitude is scaled by a factor given by (I−i)/I.

Figure 7:
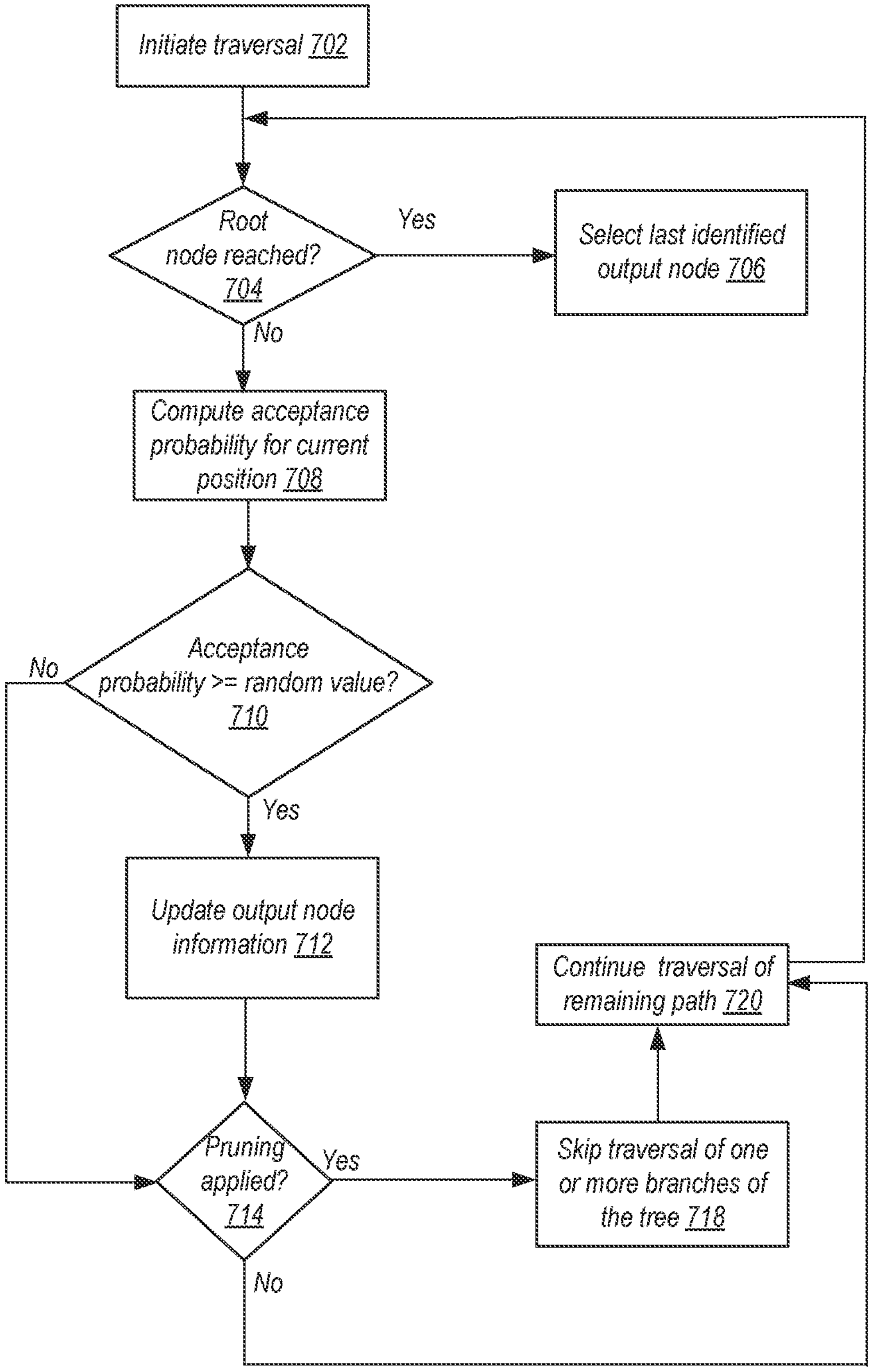
FIG. 7 illustrates an exemplary method for optimization of BVH by parallel insertion using a perturbation.

Turning now to FIG. 7, an exemplary method for optimization of BVH using a perturbation is illustrated. As described in the foregoing, the method of FIG. 7 is described with reference to a randomized parameter (such as annealing temperature) and an acceptance probability function, to admit selection of output nodes that are otherwise not selected, i.e., nodes that temporarily increase the global surface area, based on a stochastic choice to prevent getting stuck in local minima. In an implementation, the method described in FIG. 7, is implemented for each potential output node found, as described with respect to FIG. 6.

The method begins by the processing unit initiating traversal of the tree (block 702). As described in the foregoing, the tree is traversed in a predetermined traversal order, to identify one or more output nodes that can serve as potential new positions for proposed repositioning of the input node in order to realize a reduction in the surface area of the tree. The processing unit then determines whether a root node is reached in during the traversal (conditional block 704). In case the root node is reached (conditional block 704, "yes" leg), the processing unit selects the last identified output node as the final output node (block 706). As described earlier, for a given input node, the processing unit continuously identifies potential output nodes by traversing the tree till a final output node is identified such that repositioning the input node to replace the final output node results in the greatest surface area reduction of the tree, as compared to other potential output nodes. In an implementation, the traversal of the tree is performed till a root node is reached.

If the root node is not yet reached (conditional block 704, "no" leg), the processing unit computes an acceptance probability for the current position (block 708), i.e., for a node identified as a potential output node. In an implementation, the acceptance probability is computed in order to determine whether a perturbation to the method of identification of output nodes is to be initiated. For example, in one such perturbation, a simulated annealing procedure can be applied to augment the parallel insertion-based restructuring of the tree, as described above. Simulated annealing includes analysis of one or more derivable factors, such as, a randomized parameter (e.g., annealing temperature) and the acceptance probability to select new output nodes, not otherwise selected, such that the decrease in the global surface area escapes the local minima. In an implementation, for the simulated annealing perturbation, the processing unit admits a given node as potential output node, that may temporarily increase the surface area cost of the tree, in order to escape the local minima. It is noted, that as a result of admitting such nodes, and purposely worsening the tree, the system escapes the local minima. Further, as the randomized parameter is updated constantly and more such updates are admitted, the tree is optimized to have a surface area cost over time, that may be lower than that of parallel-insertion based method described in FIG. 6.

Once the acceptance probability value is computed for the current node, the processing unit determines whether the value (denoted by P) is greater a uniformly distributed random number, in one implementation, in [0,1) (conditional block 710). In an implementation, the uniformly distributed random number is generated using a random number generator. If the value of P is not greater than the random number (conditional block 710, "no" block), the method continues to block 714.

However, if the value of P is greater than the random number (conditional block 710, "yes" block), the processing unit updates the output node information owing to the updated output node (block 712), i.e., the current position being now indicated as the output node.

Referring now to conditional block 714, the processing unit determines whether pruning has been applied to the traversal. In one implementation, the processing unit determines whether pruning is applied by recomputing the value of P, e.g., using sequence (1), clamping the value to a factor given by $P_{pruning}$, and determining whether the clamped value is greater than another uniformly distributed random number. In an example, $P_{pruning}$ may be a predetermined number such as 0.01.

As described above, pruning ensures that one or more nodes that do not affect a cumulative change in the surface area of the tree are not traversed. If such a pruning is determined to be applied (conditional block 714, "yes" leg), the processing unit skips traversal of one or more branches of the tree (block 718). The processing unit then simply continues traversal to the rest of the nodes (block 720). However, if no pruning is applied (conditional block 714, "no" leg), the processing unit traverses all relevant branches of the tree for identification of potential output nodes. Once a final output node is selected, the processing unit can optimize the tree as described in FIG. 5.

In one implementation, once the processing unit traverses the entire tree (or designated portion of the tree), the processing unit chooses a position for the input node to be inserted that achieves an improved BVH (e.g., a BVH that has the lowest total surface area of the options considered). As described, an improved bounding volume hierarchy is achieved by alternating between parallel insertion and perturbation without having to remove the nodes from their respective original positions. That is, by cycling through phases having different annealing temperatures, and eventually reducing the vitality of the heating phases, the BVH having the most viable cost out of all possible topologies is selected and stored for a given scene geometry.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:

processing circuitry configured to:

access data corresponding to a bounding volume hierarchy (BVH) comprising a plurality of nodes representing bounding volumes for scene primitives, the BVH having a first surface area comprising a cumulative surface area of bounding volumes represented by internal nodes;

generate a probability value, based at least in part on a difference between the first surface area and a second surface area that would result from repositioning a first node from a first location to a second location;

modify the data by repositioning the first node from a first location to a second location, based on a comparison between the probability value and at least in part on a randomly generated value, wherein repositioning comprises removing the first node from the first location in the BVH and inserting the first node at the second location in the BVH, and wherein the repositioning results in the second surface area being greater than the first surface area; and perform a ray tracing operation using the BVH by traversing the BVH to test ray intersections with the scene primitives.

2. The system as claimed in claim 1, wherein the processing circuitry is configured to modify the data responsive to a calculated probability being greater than the randomly generated value.

3. The system as claimed in claim 2, wherein the calculated probability decreases as the difference between the first surface area and the second surface area increases.

4. The system as claimed in claim 1, wherein a decision as to whether to reposition the first node is influenced by a perturbation derived from a randomly generated value.

5. The system as claimed in claim 4, wherein the processing circuitry is further configured to:

iteratively process a plurality of locations within the BVH to select the second location;

generate, during each iteration, the randomly generated value; and reject a given location of the plurality of locations as a candidate location for repositioning the first node, responsive to the randomly generated value being lower than a threshold.

6. The system as claimed in claim 5, wherein the processing circuitry is configured to generate the value as a clamped sine function.

7. The system as claimed in claim 1, wherein the processing circuitry is configured to:

calculate a third surface area corresponding to repositioning the first node to a third location, wherein the third surface area is less than the first surface area;

generate a probability value based at least in part on a difference between the first surface area and the third surface area; and modify the data to reposition the first node to the third location, responsive to the probability value exceeding a randomly generated value.

8. The system as claimed in claim 1, wherein, based on a comparison between a calculated probability value and a randomly generated value, processing circuitry selectively performs the repositioning of the first node for a move resulting in either:

a second surface area greater than the first surface area; or a second surface area less than the first surface area.

9. A method comprising:

accessing, by processing circuitry, data corresponding to a bounding volume hierarchy (BVH) comprising a plurality of nodes representing bounding volumes for scene primitives, the BVH having a first surface area comprising a cumulative surface area of bounding volumes represented by internal nodes;

generating, by the processing circuitry, a probability value, based at least in part on a difference between the first surface area and a second surface area that would result from repositioning a first node from a first location to a second location;

modifying, by the processing circuitry, the data by repositioning the first node from a first location to a second location, based on a comparison between the probability value and a randomly generated value, wherein repositioning comprises removing the first node from the first location in the BVH and inserting the first node at the second location in the BVH, and wherein the repositioning results in the second surface area being greater than the first surface area; and performing, by the processing circuitry, a ray tracing operation using the BVH by traversing the BVH to test ray intersections with the scene primitives.

10. The method as claimed in claim 9, further comprising modifying, by the processing circuitry, the data, responsive to a calculated probability being greater than the randomly generated value.

11. The method as claimed in claim 10, wherein the calculated probability decreases as the difference between the first surface area and the second surface area increases.

12. The method as claimed in claim 9, wherein a decision as to whether to reposition the first node is influenced by a perturbation derived from a randomly generated value.

13. The method as claimed in claim 12, further comprising:

iteratively processing a plurality of locations within the BVH to select the second location;

generating, by the processing circuitry during each iteration, the randomly generated value; and rejecting, by the processing circuitry, a given location of the plurality of locations as a candidate location for repositioning the first node, responsive to the randomly generated value being lower than a threshold.

14. The method as claimed in claim 13, further comprising generating, by the processing circuitry, the value as a clamped sine function.

15. The method as claimed in claim 9, further comprising:

calculating a third surface area corresponding to repositioning the first node to a third location, wherein the third surface area is less than the first surface area;

generating a probability value based at least in part on a difference between the first surface area and the third surface area; and modifying the data to reposition the first node to the third location, responsive to the probability value exceeding a randomly generated value.

16. The method as claimed in claim 9, wherein the repositioning of the first node may be performed for a move resulting in a higher or lower surface area, based on a calculated probability exceeding a random threshold.

17. A computing system comprising:

a central processing unit;

a memory controller; and a command processor configured to:

access data corresponding to a bounding volume hierarchy (BVH) comprising a plurality of nodes representing bounding volumes for scene primitives, the BVH having a first surface area comprising a cumulative surface area of bounding volumes represented by internal nodes;

generate a probability value, based at least in part on a difference between the first surface area and a second surface area that would result from repositioning a first node from a first location to a second location;

modify the data by repositioning the first node from a first location to a second location, based on a comparison between the probability value and a randomly generated value, wherein repositioning comprises removing the first node from the first location in the BVH and inserting the first node at the second location in the BVH, and wherein the repositioning results in the second surface area being greater than the first surface area; and perform a ray tracing operation using the BVH by traversing the BVH to test ray intersections with the scene primitives.

18. The system as claimed in claim 17, wherein the probability value is calculated based at least in part on a magnitude and a direction of the difference between the first surface area and the second surface area.

19. The system as claimed in claim 18, wherein the probability value that is calculated decreases as the difference between the first surface area and the second surface area increases.

20. The system as claimed in claim 17, wherein the repositioning of the first node may be performed for a move resulting in a higher or lower surface area, based on a calculated probability exceeding a random threshold.

* * * * *